UNITED STATES PATENT OFFICE.

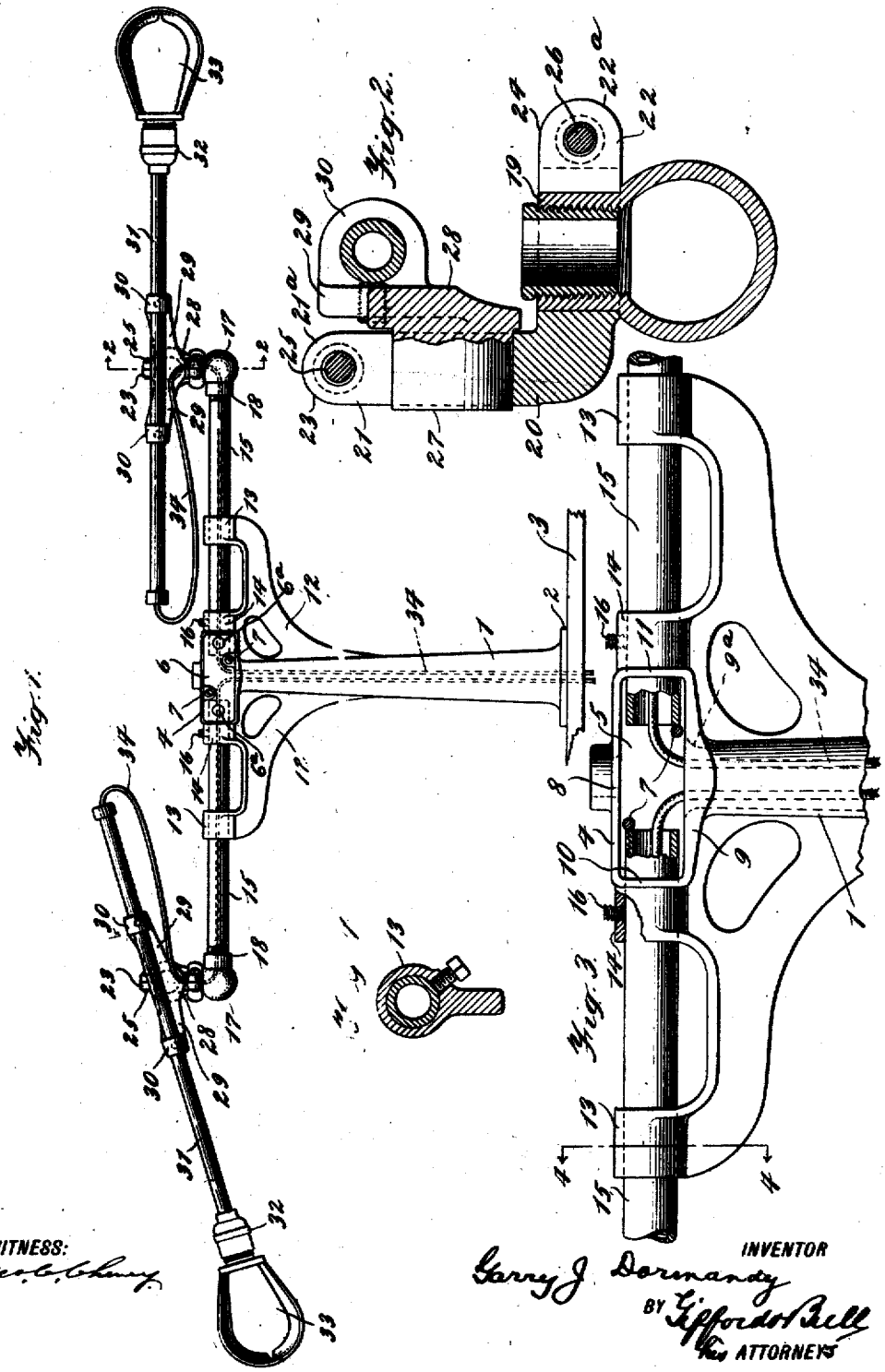

GARRY J. DORMANDY, OF TROY, NEW YORK, ASSIGNOR OF ONE-HALF TO UNITED SHIRT AND COLLAR COMPANY, OF TROY, NEW YORK, A CORPORATION OF NEW YORK.

ELECTRIC-LIGHTING FIXTURE.

1,316,700.    Specification of Letters Patent.    Patented Sept. 23, 1919.

Application filed May 10, 1917. Serial No. 167,644.

*To all whom it may concern:*

Be it known that I, GARRY J. DORMANDY, a citizen of the United States, residing at Troy, county of Rensselaer, State of New York, have invented certain new and useful Improvements in Electric-Lighting Fixtures, of which the following is a specification.

My invention relates to new and useful improvements in electric lighting fixtures.

The invention consists in the improvements to be more fully described hereinafter, and the novelty of which will be particularly pointed out and distinctly claimed.

I have fully and clearly illustrated a preferred embodiment of my invention in the accompanying drawings, to be taken as a part of this specification, and wherein—

Figure 1 is a view in elevation of an embodiment of the invention;

Fig. 2 is an enlarged detail section on the line 2—2 of Fig. 1;

Fig. 3 is an enlarged detail view of a portion of Fig. 1, parts being in section, and parts removed in order to show internal arrangements; and Fig. 4 is a section on the line 4—4 of Fig. 3.

Referring to the drawings by characters of reference, 1 designates a hollow vertical standard or pedestal provided with a base flange 2, adapted to rest on, and be secured by any suitable means, to the surface of a work table, generally indicated at 3. While I have shown the pedestal or standard as being supported on a work table, it will be understood that it can be secured to any surface suitable for the purpose. At its upper end portion the pedestal or standard is provided with a hollow box-like structure 4, having an open side face 5 adapted to be closed by a closure plate 6, said closure plate being secured in position by screws 7, or any other suitable means. The box is preferably rectangular in construction consisting of upper and lower walls 8, 9, respectively, and end walls 10, 11. The box is preferably cast integral with the upper end portion of the pedestal or standard 1, and opens through a passage 9ª into the interior of said standard.

This box may serve as a distribution or outlet box for electrical conductors and connections, the features of which are not shown, as they form no part of my present invention. Projecting from the pedestal 1, and preferably cast integral therewith are supporting members in the form of bracket arms 12, 12, of any suitable length, and each provided, at its outer end preferably, with a support or rest, which may be in the form of a cylindrical sleeve 13. Supported on the upper end portion of the standard and preferably cast integral with the ends 10, 11, of the box, heretofore described, are seats or sockets, preferably consisting of sockets or sleeve members or tubular arms 14, which are preferably integral with the standard respectively arranged in alinement with the said rests or sleeves 13, heretofore described, and which open through the end walls 10, 11, of the side box into the interior of the box 4.

15, 15, designate supporting arms or members preferably consisting of tubes, the same being arranged in the said rests or sleeves 13, and having their inner ends seated in the sockets or sleeve members 14, heretofore described. In the preferred embodiment the bracket arms 12, 12, project in opposite directions from each other, so that the members 15 when in position, as just described, also project in opposite directions from each other, as clearly indicated in Figs. 1 and 3 of the drawings. The members 15, 15, are rotatable within the supports or rests 13, and the sleeve members 14, and are also longitudinally movable through the same, so that they may be adjusted laterally toward and from the standard 1 to locate the outer ends of said members 15 at the desired point. The inner ends of the members 15 may be secured in position against turning, and also longitudinal movement, by means of clamping screws 16, threaded through the said sleeve members 14 and adapted to engage the members 15 respectively, as clearly shown in Fig. 3 of the drawings. It will be noted that the seat or sleeve member 14 serves as means for detachably supporting the member 15, and that the rest serves to support said member at a point between the said sleeve and the outer end of said member.

Upon reference to Fig. 3 of the drawings, it will be noted that the screws 7, heretofore described, for holding the cover plate 6 in position to close the box, are so located that they constitute stops to limit the inward movement of the members 15 toward each other, and toward the center line of the standard 1.

The members 15 are adapted to support at their outer end portions one member 17 of a swivel joint, the latter being preferably threaded on said members as at 18. The member 17 is provided with a cylindrical pivot member 19 adapted to be engaged by a swivel bracket or member 20, comprising angularly disposed members 21, 22, arranged at right angles to each other and each including two arms or members 21ª, 22ª, which are provided at their free ends with apertured ears 23, 24, the apertures of which receive adjusting screws 25, 26, by which the arms of each member may be adjusted toward and away from each other. The opening between the arms 22ª of the member 22 is adapted to receive the said pivot member 19, and the said arms are adapted to engage the same, the degree of engagement being determined by adjustment of the screw 26 whereby the bracket is rotatably adjustable or movable about the said pivot member 19, so that it may be turned by said member 19 and will be frictionally held in the position to which it is adjusted. The arms 21ª of the member 21 are adapted to receive a cylindrical pivot member or pin 27 carried on the rear face of a part 28, having oppositely disposed arms 29 carrying apertured guide sleeves 30 in alinement with each other, and through the apertures of which is slidably and rotatably mounted a supporting member, preferably in the form of a rigid tube 31, at one end of which is carried a socket 32 for an incandescent lamp 33. The swivel joint just described is not specifically claimed herein, but is made the subject-matter of my prior application No. 158,801, filed March 31, 1917.

It will be seen that by rotation of the members 15, or longitudinal movement thereof, in the sockets or sleeve members 14 and the rests 13, said members may be adjusted individually so as to locate the respective swivel joints carried thereby at the desired point laterally of the standard 1. The arrangement not only permits the adjustment just described but also permits the use of supporting members 15 of different lengths in connection with the standard 1.

The conductors 34 for the lamp preferably pass upward through the standard 1, through box 5 into the inner ends of the members 15, and through the latter to the swivel-joint member 17, through which they pass and emerge through the pivot member 19. The conductors are then carried into the rear end of the member 31 and pass through said member to the socket 32.

If it is desired to make the members 15 of solid bars instead of tubular, the cover plate 6 is provided with outlet openings 6ª, from which the conductors 34 may be led to the rear open end of the lamp support and tubes 31.

What I claim and desire to secure by Letters Patent of the United States is:—

1. In a lighting fixture, a standard, a sleeve member projecting laterally from said standard, a supporting member mounted in said sleeve, a swivel joint connection on said supporting member, and a lamp supporting member supported by said swivel joint connection.

2. In a lighting fixture, a standard, a supporting member projecting laterally from the standard, means whereby said member is longitudinally adjustable laterally of the standard, a tubular lamp supporting member, and a swivel connection between said lamp supporting member and said first-named supporting member.

3. In a lighting fixture, a standard, a sleeve member projecting laterally from said standard, a supporting member longitudinally movable in said sleeve member, a swivel joint connection on said supporting member, and a lamp supporting member supported by said swivel joint connection.

4. In a lighting fixture, a standard, an arm rigid with said standard and projecting laterally therefrom, a rest rigid with the outer end of said arm, a socket rigid with the standard and in longitudinal alinement with the rest on said arm, a supporting member on said rest and having one end seated in said socket, a swivel joint connection on said supporting member, and a lamp supporting member supported by said swivel joint connection.

5. In a lighting fixture, a standard, a box structure on the standard, a sleeve member projecting laterally from said box structure, a supporting member having one end mounted in said sleeve structure, a swivel connection on said supporting member, and a lamp supporting member supported by said swivel connection.

6. In a lighting fixture, a standard, an arm integral with the standard, a rest integral with said arm, a socket integral with the standard and in alinement with said rest, a supporting member on the rest and having one end seated in said socket, said member being longitudinally movable on said rest and in said socket, and means adapted to be engaged by the inner end of the said supporting member to limit movement of the supporting member toward the standard, a swivel joint on said supporting member, and a lamp supporting member longitudinally movable on said swivel joint.

7. In a lighting fixture, a standard, a box structure on the standard, an arm on the standard and having a rest, a socket in alinement with said rest and communicating with said box, and a hollow lamp supporting member supported on the rest and having one end seated in said socket, said hollow lamp supporting member opening through the socket into said box structure.

8. In a lighting fixture, a standard, a box structure on the standard and opening into the latter, an arm on the standard having a rest, a socket in alinement with the rest and communicating with said box, a hollow lamp supporting member supported on the rest and having one end seated in said socket, said hollow lamp supporting member opening through the socket into said box structure, a cover plate for the box structure, and a fastening device for securing said plate in position, said fastening device being located to serve as a stop to limit movement of the lamp supporting member.

9. In a lighting fixture, a standard, a box structure on the standard, an arm on the standard and carrying a sleeve, a socket on the standard in alinement with said sleeve, and a lamp supporting member longitudinally movable through said sleeve and having one end seated in said socket.

10. In a lighting fixture, a standard, a box structure on the standard, an arm on the standard, having a sleeve, a socket integral with a wall of the box structure and communicating with the interior of the latter, and a hollow lamp supporting member arranged in said sleeve and having an end seated in said socket.

11. In a lighting fixture, a standard, a box structure on the standard, an arm projecting from the standard and having a sleeve, a socket on said standard, a hollow lamp supporting member arranged in said sleeve and having an end seated in said socket, said socket opening into said box structure, means for limiting longitudinal movement of said lamp supporting member, and means for clamping said lamp supporting member in position.

12. In a lighting fixture, a standard, a box structure on the standard, an arm on the standard and having a sleeve integral therewith, a socket on the standard in line with said sleeve, a hollow lamp supporting member longitudinally and rotatably movable in said sleeve and socket, means to limit longitudinal movement of the lamp supporting member, and means to clamp the same against rotatable movement.

13. In a lighting fixture, a standard, an arm projecting laterally from said standard, a horizontal supporting member mounted for longitudinal adjustment on said arm and detachably connected thereto, a swivel joint connection on said supporting member, and a lamp supporting member supported by said swivel joint connection.

14. In a lighting fixture, a standard, a laterally projecting supporting member, means for connecting said member to said standard and providing for longitudinal adjustment of said member, a swivel joint connection on said supporting member, and a lamp supporting member supported by said swivel joint connection.

In testimony whereof I have hereunto signed my name in the presence of two subscribing witnesses.

GARRY J. DORMANDY.

Witnesses:
C. G. HEYLMUN,
E. M. LOCKWOOD.